United States Patent [19]

Medford et al.

[11] Patent Number: 5,242,719
[45] Date of Patent: Sep. 7, 1993

[54] ABRASION RESISTANT UV-CURABLE HARDCOAT COMPOSITIONS

[75] Inventors: George F. Medford, Ballston Lake; Gregory R. Gillette, Clifton Park, both of N.Y.

[73] Assignee: General Electric Company, Waterford, N.Y.

[21] Appl. No.: 864,113

[22] Filed: Apr. 6, 1992

[51] Int. Cl.$^5$ .................. B05D 3/06; C08F 2/50; C08K 3/34; B32B 9/04
[52] U.S. Cl. .................. 427/515; 427/519; 522/37; 522/83; 522/84; 522/99; 428/412; 428/447; 524/806; 526/279; 528/26; 528/32
[58] Field of Search ........... 522/68, 84, 37, 83, 522/99; 428/412, 447; 427/515, 519; 524/806; 526/279; 528/26, 32

[56] References Cited

U.S. PATENT DOCUMENTS

| 4,455,205 | 6/1984 | Olson et al. | 524/291 |
|---|---|---|---|
| 4,486,504 | 12/1984 | Chung | 528/32 |
| 4,491,508 | 1/1985 | Olson et al. | 528/32 |
| 4,576,870 | 3/1986 | Liebler et al. | 428/412 |
| 4,650,845 | 3/1987 | Hegel | 522/96 |

FOREIGN PATENT DOCUMENTS

| 2033960 | 7/1991 | Canada. |
| 0331087 | 9/1989 | European Pat. Off. . |
| 0336474 | 10/1989 | European Pat. Off. . |
| 0408047 | 1/1991 | European Pat. Off. . |
| 0424006 | 4/1991 | European Pat. Off. . |
| 0424007 | 4/1991 | European Pat. Off. . |

*Primary Examiner*—Susan Berman

[57] ABSTRACT

A method of making a UV curable hardcoat composition uses a strip-free process and produces hardcoats having good scribed tape-pull adhesion, high resistance to scratching and a low delta taber haze after abrading for 500 cycles with a 500 gram weight. UV curable hardcoat compositions are also provided which contain high solids contents and high mole percentages of photoinitiator. Compositions containing methoxypropanol as a water miscible alcohol and methylbenzoylformate as a photoinitiator exhibit high taber hardness and can be made by processes which obviate the need for a time and energy consuming solvent-strip step. The processes are not only shorter, but safer than processes which include a solvent-strip step.

15 Claims, No Drawings

ABRASION RESISTANT UV-CURABLE HARDCOAT COMPOSITIONS

FIELD OF THE INVENTION

The present invention relates to UV curable hardcoat compositions and processes for making the compositions. The processes are free of a solvent strip step and the compositions produced from the processes exhibit abrasion resistant coatings after UV curing.

BACKGROUND OF THE INVENTION

It is known to treat thermoplastic substrates such as polycarbonate articles, for example, with photocurable acrylic coating compositions as shown in U.S. Pat. Nos. 4,455,205 and 4,491,508 to Olson et al. and in U.S. Pat. No. 4,198,465 to Moore et al., all assigned to the same Assignee as the present invention. Although cured polyacrylate coatings are physically and chemically durable, some polyacrylic coatings often do not satisfy the abrasion resistant standards required in many applications. Further, processes for producing these coating compositions are time and energy consuming. In some instances, the processes are hazardous.

For example, U.S. Pat. Nos. 4,491,508 and 4,455,205 to Olson et al. disclose processes for producing UV curable coating compositions which processes include extended periods of distillation or reflux to remove water and large amounts of water miscible alcohols. According to these disclosures, water miscible alcohol comprises greater than 50% (and in some cases greater than 75%) of an initial mixture of water miscible alcohol, colloidal silica, silyl acrylate and acrylic monomer.

Oxygen present during the strip step minimizes premature polymerization of the acrylic monomer. The addition of a free radical scavenger protects the acrylic monomer, especially under the conditions of vacuum and heat which are called for.

Isopropyl alcohol (IPA) is used to remove water during the solvent strip step. IPA has a low flash point. Introduction of oxygen in amounts greater than 10% above the flash point is dangerous. However, if less than about 5% oxygen is added, the acrylic monomer will begin to polymerize. Introduction of oxygen at such a precise concentration further complicates the process.

A need therefore exists for a method of making a UV curable hardcoat composition which is safe, time and energy efficient, and has good kettle utilization in terms of the volume ratio of initial reactants to resultant products.

SUMMARY OF THE INVENTION

The present invention provides methods of making a UV curable hardcoat composition which are substantially free of any solvent-strip step. The processes are energy and time efficient, safer than processes which employ a strip step, and make good utilization of reactor volumes based on the amount of final products produced from a given amount of initial components. In one embodiment, a process utilizes small amounts of methoxypropanol as a water miscible alcohol in place of isopropyl alcohol. In another embodiment, the present invention uses a low molecular weight photoinitiator, i.e. methylbenzoylformate in amounts of greater than 5% by weight. The use of more than 5% of this lightweight photoinitiator greatly increases the mole percentage of photoinitiator in comparison to higher molecular weight photoinitiators at lower amounts.

According to an embodiment of the present invention, UV curable organopolysiloxane hardcoat compositions comprise by weight (A) about 1 part by weight to about 60 parts by weight colloidal silica, (B) about 1 part by weight to about 50 parts by weight material resulting from the hydrolysis and condensation reaction of a silyl acrylate of the formula:

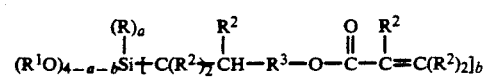

(C) about 25 parts by weight to about 90 parts by weight acrylate monomer of the formula:

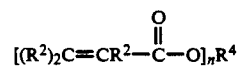

wherein R is a $C_{(1-13)}$ monovalent organic radical containing 1 to about 13 carbon atoms (e.g., $C_{1-13}$), $R^1$ is a $C_{(1-8)}$ alkyl radical, $R^2$ is selected from hydrogen, R and mixtures thereof, $R^3$ is a $C_{(1-8)}$ alkylene radical, $R^4$ is a polyvalent organic radical, a is a whole number equal to 0-2 inclusive, b is an integer equal to 1-3 inclusive, the sum of a+b is equal to 1-3, and n is an integer from 2 to 6 inclusive, where the sum of (A), (B) and (C) is 100 parts by weight, and (D) more than 5 parts by weight UV photoinitiator based upon (A), (B) and (C).

A water miscible alcohol solvent is preferably added in an amount effective to keep the reactants from solidifying. The alcohol particularly prevents a solidifying reaction between Components (A) and (B) and is thus preferably added before the two are mixed. The alcohol may be added to Components (A), (B) or (C) prior to mixing Component (A), (B) or (C) with the other components. If Components (A) and (B) are first mixed, the alcohol is preferably added within 30 minutes such that no substantial solidification between (A) and (B) takes place. It is possible to add the alcohol at any time during addition of the other components. The alcohol may even be added later, although not preferred, to reverse the solidification reaction.

DETAILED DESCRIPTION OF THE INVENTION

The safe and energy and time efficient method for making a UV curable hardcoat composition according to the present invention comprises:

(1) agitating a mixture of water miscible alcohol, colloidal silica (Component (A)) and a silyl acrylate of the formula:

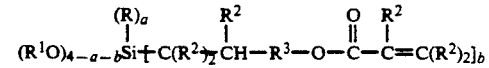

(2) adding acrylic monomer (Component (C)) of the formula:

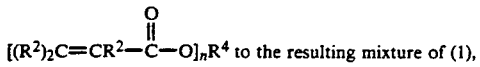 to the resulting mixture of (1), wherein, in Components (B) and (C), R is a $C_{(1-13)}$ monovalent organic radical, $R^1$ is a $C_{(1-8)}$ alkyl radical, $R^2$ is selected from hydrogen, R and mixtures thereof, $R^3$ is a $C_{(1-8)}$ alkylene radical, $R^4$ is a polyvalent organic radical, a is a whole number equal to 0-2 inclusive, the sum of a+b is equal to 1-3, and n is an integer from 2 to 6 inclusive; and (3) adding a UV photoinitiator to the resulting mixture of (2).

The material resulting from the hydrolysis and condensation reaction of the silyl acrylate makes up Component (B). For purposes of clarity, the combination of Components (A), (B) and (C) is defined as equaling a total of 100 parts by weight. Other Components are added in parts by weight based on the sum of Components (A), (B) and (C).

Optionally, the mixture of (1) may be heated in the form of a cook (2 hrs. at reflux of 50°-90° C.) to accelerate the reaction.

The method is substantially free of a solvent strip step with the exception of any incidental evaporation from the resulting mixture of (2) which may occur prior to adding the photoinitiator. There is no need for any distillation or reflux of the resulting mixture of (2), and, according to an aspect of the present invention, any such strip step is strictly avoided. Eliminating the strip step precludes the introduction of oxygen to the alcohol at temperatures above the flash point, thereby avoiding the possibility of an explosion.

According to one embodiment of the present invention, the process consists essentially of steps (1), (2) and (3). The process produces a composition which can be applied and cured with a UV source. In another, even simpler embodiment of the invention, prior to application and curing, the process consists only of steps (1), (2) and (3).

In formula (1), R is more particularly selected from $C_{(1-8)}$ alkyls, such as methyl, ethyl, propyl, butyl, etc.; aryl radicals and halogenated aryl radicals, for example, phenyl, tolyl, xylyl, naphthyl, chlorophenyl, etc.; radicals included within $R^1$ are, for example, all of the $C_{(1-8)}$ alkyl radicals included within R; and radicals included within $R^2$ are hydrogen and the same or different radicals included within R. $R^3$ includes divalent alkylene radicals, for example, methylene, ethylene, trimethylene, tetramethylene, etc. Divalent organic radicals included within $R^4$ are $R^3$ radicals, branched $C_{(2-8)}$ alkylene radicals, branched halogenated $C_{(2-8)}$ alkylene radicals, branched hydroxylated $C_{(2-8)}$ alkylene radicals, branched hydroxylated $C_{(2-8)}$ alkylene radicals, branched acrylate radicals, $C_{(6-13)}$ arylene radicals, for example, phenylene, tolylene, naphthylene, etc., halogenated $C_{(6-13)}$ arylene radicals, etc.

Formula (2) includes polyfunctional acrylate monomers, for example, diacrylates of the formulas:

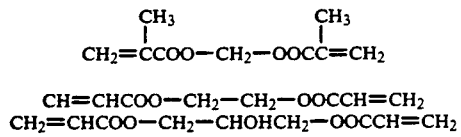

CH=CHCOO—CH₂—CH₂—OOCCH=CH₂
CH₂=CHCOO—CH₂—CHOHCH₂—OOCCH=CH₂

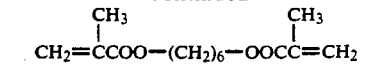

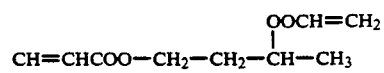

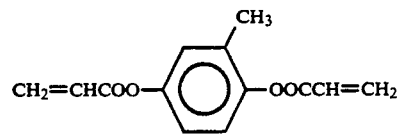

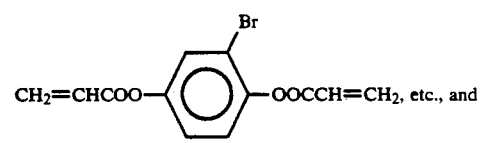, etc., and triacrylates of the formulas:

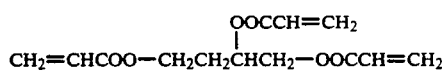

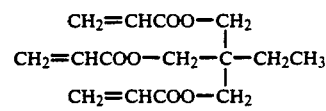

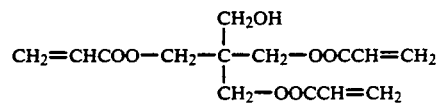

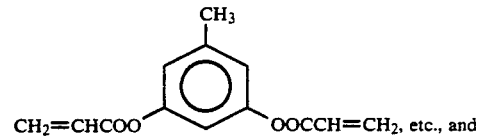, etc., and tetraacrylates of the formulas:

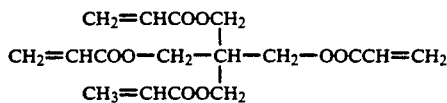

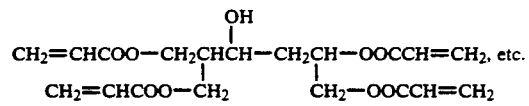, etc.

Included within the silyl acrylates of formula (1) are compounds having the formulas:

CH₂=CCH₃CO₂—CH₂CH₂—Si(OCH₂CH₃)₃,
CH₂=CHCO₂—CH₂CH₂—Si(OCH₃)₃,
CH₂=CCH₃CO₂—CH₂CH₂CH₂—Si(OCH₂CH₃)₃,
CH₂=CHCO₂—CH₂CH₂—Si(OCH₂CH₃)₃,
CH₂=CCH₃CO₂—CH₂CH₂CH₂—Si(OCH₃)₃,
CH₂=CHCO₂—CH₂CH₂CH₂—Si(OCH₃)₃,
CH₂=CCH₃CO₂—CH₂CH₂CH₂—Si(OCH₂CH₃)₃,
CH₂=CHCO₂—CH₂CH₂CH₂—Si(OCH₂CH₃)₃,
CH₂=CCH₃CO₂—CH₂CH₂CH₂CH₂—Si(OCH₃)₃,
CH₂=CHCO₂—CH₂CH₂CH₂CH₂—Si(OCH₃)₃,
CH₂=CCH₃CO₂—CH₂CH₂CH₂C—
H₂—Si(OCH₂CH₃)₃,
CH₂=CHCO₂—CH₂CH₂CH₂CH₂—Si(OCH₂CH₃)₃, etc.

Colloidal silica, another of the necessary ingredients of the hardcoat composition of the present invention, is a dispersion of submicron-sized silica ($SiO_2$) particles in an aqueous or other solvent medium. It is the polysiloxane backbone derived from the silica which provides the hardcoat composition with many of the advantages inherent in silicone products such as a wide-ranging resistance to environmental extremes. The $SiO_2$ provides quadri-functional (Q) silicon atoms and adds hardness to the coatings. When mixed with tri-functional (T) silicon-containing acrylates, TQ mixtures are formed.

Dispersions of colloidal silica are available from chemical manufacturers such as DuPont and Nalco Chemical Company. Colloidal silica is available in either acidic or basic form. However, for purposes of the present invention it is preferable that the acidic form be utilized. It has been found that superior hardcoat properties can be achieved with acidic colloidal silica (i.e., dispersions with low sodium content). Alkaline colloidal silica also may be converted to acidic colloidal silica with additions of acids such as HCl or $H_2SO_4$ along with high agitation.

Nalcoag 1034A is an example of a satisfactory colloidal silica for use in these coating compositions, available from Nalco Chemical Company, Chicago, Ill. Nalcoag 1034A is a high purity, acidic pH aqueous colloidal silica dispersion having a low $Na_2O$ content, a pH of approximately 3.1 and an $SiO_2$ content of approximately 34 percent by weight. In the examples given below, the weight in grams or parts by weight of the colloidal silica includes its aqueous medium. Thus, for example, 520 grams of Nalcoag 1034A colloidal silica represents, approximately, 177 grams of $SiO_2$ by weight. It should be noted, however, that the aqueous medium is a convenient way of handling the colloidal silica and does not form a necessary part of the hardcoat compositions of the present invention. However, since water is required for the SiOR hydrolysis, some water must be added to non-aqueous colloidal silica. In fact, these coating compositions find particularly beneficial utility in that they may be part of a substantially solventless system.

The term colloidal silica is intended to represent a wide variety of finely divided $SiO_2$ forms which can be utilized to form the hardcoat compositions of the present invention without the necessity of undue experimentation. Further description can be found in U.S. Pat. No. 4,027,073.

Although the coating compositions may contain only one of said polyfunctional acrylate monomers, preferred coating compositions contain a mixture of two or more polyfunctional monomers, preferably a diacrylate and a higher functional acrylate. In addition, minor amounts of mono-acrylate can be used in particular instances. Further, the UV curable compositions of the present invention can contain nonacrylic UV curable aliphatically unsaturated organic monomers in amounts up to 50% by weight of the UV curable hardcoat compositions which include, for example, such materials as N-vinyl pyrrolidone, styrene, etc.

Coating compositions which contain a mixture of diacrylates and higher functional acrylates, have a preferred ratio, by weight, between the two of from about 10:90 to about 90:10. Exemplary mixtures of diacrylate and higher functional acrylates include mixtures of hexanediol diacrylate with trimethylolpropane triacrylate, hexanediol diacrylate with pentaerythritol triacrylate, hexanediol diacrylate with dipenta-erythretol-pentaacrylate, diethyleneglycol diacrylate with pentaerythritol triacrylate, and diethyleneglycol diacrylate with trimethylolpropane triacrylate. Coatings containing the photoreaction product of two polyfunctional acrylate monomers are preferred.

The coatings may likewise contain the ultraviolet light reaction product of a single polyfunctional acrylate monomer. Preferably, both a diacrylate and a higher functional acrylate are used.

One preferred higher functional acrylate is trimethylolpropane triacrylate. Compositions comprising between 0.2 and 90 parts by weight trimethylolpropane triacrylate, as Component (C), before or after curing are preferred. Cured compositions comprising from about 2 to about 90 parts by weight are also preferred.

The photocurable coating compositions also contain a photosensitizing amount of photoinitiator, i.e., an amount effective to effect the photocure in a non-oxidizing atmosphere, for example, nitrogen, of the coating composition. Generally, this amount is from about 0.01 to about 10 parts by weight, and preferably from about 0.1 to about 5 parts by weight based upon the total of (A), (B) and (C).

As shown in U.S. Pat. No. 4,491,508, certain blends of ketone-type and hindered amine type materials are photoinitiators effective for crosslinking the above described coating compositions in air to form suitable hard coatings upon exposure to UV radiation. That patent is herein incorporated by reference.

The ketone-type photoinitiator which is preferably used in U.S. Patent No. 4,491,508 is $\alpha,\alpha$diethoxyacetophenone. According to an aspect of the present invention, it has been discovered that by adding greater than 5 parts by weight photoinitiator to 100 parts by weight of the various formulations of UV curable hardcoats based on U.S. Pat. No. 4,455,205, both faster cure and harder coatings are exhibited. U.S. Pat. No. 4,455,205, herein incorporated by reference, discloses the use of 0.1 to 5% photoinitiator. According to the present invention, the use of high weight percentages of low molecular weight photoinitiator produces hardcoats having particularly shorter cure times and harder coatings.

In U.S. Pat. No. 4,455,205, the photoinitiator $\alpha,\alpha$-diethoxyacetophenone has a molecular weight of 208 and is used in the range of 0.1 to 5% by weight. According to an aspect of the present invention, methylbenzoylformate, having a molecular weight of 164, is used at 5 parts by weight or more. At 5.7 parts by weight methylbenzoylformate, 50 mole percent more photoinitiator is available in the formulations than the mole percent available when using 5 parts by weight of the heavier $\alpha,\alpha$-diethoxyacetophenone. Methylbenzoylformate is available as Vicure 55 from Akzo Chemicals, Inc., Chicago, Ill. According to this embodiment of the present invention, 35 millimoles of photoinitiator per 100 g of coating is available versus 24 millimoles of photoinitiator per 100 g of coating as shown in U.S. Pat. No. 4,455,205. Additionally, a wider range of substrates can be coated at the higher level of photoinitiator. Examples 4-6 below show the advantages of using the lower molecular weight photoinitiator. The photoinitiators break down to free radicals when exposed to UV light. The free radicals then open the double bonds between carbon atoms in acrylate groups.

The amount of photoinitiator added to the compositions is greater than 5 parts by weight based on 100 parts by weight of non-volatile components, (A), (B) and (C). Preferably, between 5 and about 12 parts by weight are used when the photoinitiator is methylbenzoylformate. More preferably, between about 6 and about 7% by weight methylbenzoylformate is added. In the compositions shown in the Examples below, it is preferred to use between about 9 and about 11 mole percent photoinitiator based upon the number of moles of reactants.

The use of greater amounts of photoinitiator produces hardcoats having shorter cure times. These hardcoats are particularly useful and desired for coating films at high rates. Current film application cure rates range from about 30 to 100 feet per minute (fpm). However, according to the present invention, higher cure rates are obtainable since the high amounts of photoinitiator enable a faster cure. Film coatings comprising the hardcoats of the present invention can be cured by passing under a UV source at rates of 50 to as high as 500 feet per minute if enough light sources are used. At such high rates and under similar conditions, the hardcoats of the prior art would remain less cured as evidenced by softer coatings.

The coating compositions of the instant invention may also optionally contain UV absorbers or stabilizers such as resorcinol monobenzoate, 2-methyl resorcinol dibenzoate, etc. The stabilizers can be present in an amount, based upon the weight of the coating compositions, exclusive of any additional solvent which may optionally be present, from about 0.1 to 25 parts by weight, preferably from about 3 to about 18 parts by weight based on (A), (B) and (C). The UV curable coating composition can contain from about 1 to about 25 parts by weight of stabilizers based on (A), (B) and (C).

The coating compositions of the present invention may also optionally contain various flattening agents, surface active agents, thixotropic agents, UV light stabilizers, hindered amine light stabilizers (HALS) and dyes. All of these additives are well known in the art and do not require extensive discussions. Therefore, only a limited number will be referred to, it being understood that any of these compounds can be used so long as they do not deleteriously affect the photocuring of the coating compositions and do not adversely affect the non-opaque character of the coating.

The various surface-active agents, including anionic, cationic and nonionic surface-active agents are described in Kirk-Othmer Encyclopedia of Chemical Technology, Vol. 19, Interscience Publishers, New York, 1969, pp. 507-593, and Encyclopedia of Polymer Science and Technology, Vol. 13, Interscience Publishers, New York, 1970, pp. 477-486, both of which are incorporated herein by reference. Also, flow control and leveling additives such as BYK300 and BYK310 from BYK Chemie, Wallingford, CT, may be added in amounts of from 0.01 to 6 parts by weight based on (A), (B) and (C).

According to an embodiment of the present invention, the photocurable coating compositions are made by blending together the aqueous colloidal silica, the silyl acrylate, the polyfunctional acrylic monomer or mixtures thereof, the UV photosensitizer, and optionally any of the other aforementioned additives. In one blending procedure, the silyl acrylate can be hydrolyzed in the presence of aqueous colloidal silica and a water miscible alcohol. In another procedure the aqueous colloidal silica can be added to the silylacrylate which has been hydrolyzed in aqueous alcohol. Suitable alcohols include, for example, any water miscible alcohol, for example, methanol, ethanol, propanol, isopropyl alcohol, butanol, etc., or ether alcohols, such as ethoxyethanol, butoxyethanol, methoxypropanol, etc. Preferably, the water miscible alcohol comprises less than 50% of the resulting mixture of (3). Only sufficient water-miscible alcohol need be added in order to azeotropically remove the water which is present. For example, a sufficient amount of methoxypropanol is an amount approximately equal to the amount of water present.

According to an embodiment of the present invention, the ether alcohol methoxypropanol is used as the water miscible alcohol. As shown in Examples 2 and 3 below, it has been discovered that only about 13% as much water miscible alcohol is needed when methoxypropanol is used in place of isopropyl alcohol. When methoxypropanol is used, a hardcoat results having as good a scribed tape-pull adhesion, abrasion resistance, and delta Taber haze after Taber abrasion as hardcoats made with isopropyl alcohol. Preferably, less than 50% of the resulting mixture of (3) is methoxypropanol.

In a further procedure, aqueous colloidal silica and the silylacrylate are combined and stirred until hydrolysis has been effected. The hydrolysis of the silylacrylate can be accomplished at ambient conditions, or can be effected by heating the hydrolysis mixture to reflux for a few minutes, preferably, a few hours.

Although the order of addition of the various ingredients in the UV curable coating compositions of the present invention is not critical, it is preferred to add the polyfunctional acrylic monomer, or mixture thereof, to the above described mixture of hydrolyzed silyl acrylates and colloidal silica. Preferably, the polyfunctional acrylic monomer or mixtures thereof is added to the mixture of silyl acrylate and colloidal silica while it is stirring in a suitable hydrolysis medium, such as an aqueous solution of a water miscible alcohol as previously described.

It has been found that at least one part of the silyl acrylate per 10 parts of $SiO_2$ should be used in the UV curable composition to minimize the formation of gel.

The hard coat compositions of the present invention are based on silicon-containing ingredients due to the condensation of colloidal silica and the silyl acrylate. A variation of the silicon content of the hardcoat composition has been found to influence such physical properties as the abrasion resistance of the resulting hardcoat. Additional properties, for example, the adhesion lifetime of the hardcoat on a thermoplastic substrate can also be enhanced by optimizing the formulation of the UV curable hardcoat composition.

According to an embodiment of the present invention, colloidal silica is mixed with a tri-functional silicon-containing acrylate such as γ-methacryloxypropyl trimethoxysilane. After mixing at an elevated temperature, a diacrylate is then added to the mixture. One particularly useful diacrylate is hexanedioldiacrylate (HDDA). When HDDA is added to the above mixture, a silica acrylate of the formula TQ/HDDA is produced.

Silica acrylate, such as TQ/HDDA, is the base composition of UV curable hardcoats in accordance with an embodiment of the present invention. The silica acrylate is blended with a photoinitiator and optionally an additional acrylate to give a UV curable composition. One additional acrylate which is particularly useful in accordance with the present invention is trimethylolpropane triacrylate (TMPTA). It has been determined in accordance with the present invention that mixing substantially equal amounts of TMPTA and the base composition and adding 5-12 parts by weight photoinitiator, results in hardcoats which exhibit excellent abrasion resistance and little or no cracking after cure.

Prior to catalyzing with the photoinitiator, other components may be added to the base composition. It has been known to add free radical scavengers such as paramethoxy phenol to prevent acrylate reactions during stripping. However, these scavengers can also become counter-productive when trying to cure the acrylates by free radical reactions. According to the present invention, no stripping step occurs thus the need to add scavengers of this type is obviated.

Other acrylates which may be added to the base composition include, but are not limited to, dipentaerythritol pentaacrylate (DPEPA) and octyldecylacrylate (ODA). DPEPA can be added in amounts of up to 90 parts by weight, based on the total weight of Components (A), (B) and (C), to control the cure speed of the composition. Amounts in the range of 10-50 parts by weight are preferred. Since DPEPA reacts very quickly, it is believed that greater amounts result in faster curing compositions.

ODA can be added to control the viscosity of the hardcoat composition to facilitate application prior to curing. The light molecular weight ODA has a very low viscosity so it can be used to "thin" base compositions. If used, between 0.1 and 50 parts by weight based on (A), (B) and (C) is preferred, with 5 to 25 parts by weight being more preferred.

A wide variety of ultraviolet absorbers can also be added to the base formulations. Each absorber typically has a well defined range of absorption frequencies. More than one absorber may be added to cover a wider range of UV frequencies. The UV absorbers capture UV light, thus protecting the substrate from degradation upon exposure to UV light, for example, during outdoor weathering.

Preferably, UV absorbers are used in a total amount of between 1 and about 20 parts by weight based on (A), (B) and (C) with the range of 6-18 parts by weight based on (A), (B) and (C) being more preferred. The specific UV absorbers used in the Examples below are described in greater detail in the Examples. The range of between about 2 and about 22 parts by weight UV absorbers is generally preferred.

The UV absorbers are usually added prior to addition of the photoinitiator. After the photoinitiator is added to the composition, the composition is applied to a substrate. Curing the composition comprises a flash cycle for a time period of up to several minutes and at least one pass under a UV light source.

Suitable thermoplastic substrates which can be utilized in the practice of the present invention to produce shaped thermoplastic articles having enhanced abrasion resistance are, for example, Lexan polycarbonate, Valox polyester, Mylar polyester, Ultem polyetherimide, PPO polyphenyleneoxide, polymethylmethacrylate, vinyl, ABS, styrene, etc. Other substrates include metals such as steel, aluminum, metalized thermoplastics, etc. and glass- or mineral-filled plastics.

In order that those skilled in the art will be better able to practice the invention, the following examples are given by way of illustration and not by way of limitation. All parts are by weight.

EXAMPLE I

The process for a silica acrylate-based, hardcoat. In a 50 gallon reactor, fitted with a heating jacket, a stirrer, a dip leg, and a reflux condenser, 266 pounds isopropyl alcohol (IPA), 54.5 pounds Nalcoag 1034A colloidal silica at 34% colloidal silica in water, and 19.6 g paramethoxy phenol were mixed for a few minutes. An addition of 8.2 pounds methacryloxypropyl trimethoxysilane (MAPTMS) at 72% hydrolyzed and condensed solids was then made over a period of a 2-3 minutes. This hydrolysis mixture was then heated and held at reflux, while bleeding air to the solution, for 2 hours. After this cook, 22.8 pounds hexanedioldiacrylate (HDDA) (SR238 from Sartomer Company, West Chester, PA) was added and stripping was begun, finishing up at 130-150 mm Hg, with a jacket temperature of 60° C. During the strip, air was bled to the bottom of the kettle. The strip was continued for one hour after the over head flow had ceased. At the end of the strip, the silica acrylate, a TQ/HDDA blend was recovered, having a viscosity of 68 cps.

SAMPLE 1

A 14.15 g sample of the silica acrylate was blended with 14.15 g trimethylolpropane triacrylate (TMPTA from Radcure Specialties, Louisville, Ky.), 1.7 g methylbenzoylformate (Vicure 55 from Akzo Chemie), and 0.1 g BYK310 (a solution of polyester modified polydimethylsiloxane from BYK Chemicals, Wallingford, CT). To facilitate coating, the mixture was cut to 30% silica plus acrylate solids with 35 g IPA and 35 g methoxypropanol (Dowanol PM). This coating was applied to Lexan 9030 polycarbonate by flow coating, and was allowed to flash for 2 minutes at 25° C.. The coating was then cured with one pass at 25 fpm through a Fusion Systems Processor (2-300 Watt per inch, H lamps, 1.98 inches from the coating). The coating had good scribed tape-pull adhesion and resistance to 11 double rubs with #0000 steel wool. After Taber abrading for 500 cycles with 500 gram weights, the panel had a delta haze of 4.7%.

EXAMPLE II

The non-stripped silica acrylate-based hardcoat. In a 2 liter erlenmeyer flask, fitted with a stirrer, 464 g IPA, 86.9 g Nalcoag 1034A, 0.07 g paramethoxy phenol, and 12.97 g methacryloxypropyl trimethoxysilane (MAPTMS) were added. This hydrolysis mixture was then heated and held at reflux, without bleeding air to the solution, for 2 hours. After this cook, 36.3 g hexanedioldiacrylate (HDDA) was added to give the silica acrylate, a TQ/HDDA blend, in a mixture of IPA and water.

SAMPLE 2

A 564 g sample of the silica acrylate solution containing the equivalent of 75.2 g silica acrylate, was blended with 75.2 g TMPTA, 9.0 g Vicure 55, and 0.47 g BYK310. The coating was applied as is (23% silica and acrylate solids) to ¼" Lexan LS2-111 polycarbonate by flow coating, and was allowed to flash for 2 minutes at 25° C. The coating was then cured with one pass at 25 fpm through a Fusion Systems Processor (2-300 Watt per inch, H lamps, 2.1 inches from the coating). The coating had good scribed tape-pull adhesion and resistance to 11 double rubs with #0000 steel wool. After Taber abrading for 500 cycles with 500 gram weights, the panel had a delta haze of 4.2%.

EXAMPLE III

High solids, non-stripped silica acrylate-based hardcoat. In a 2 liter erlenmeyer flask, fitted with a stirrer, 61 g methoxypropanol, 86.9 g Nalcoag 1034A, 0.07 g paramethoxy phenol, and 12.97 g MAPTMS were added. This hydrolysis mixture was then heated and held at reflux, without bleeding air to the solution, for 3 hours. After this cook, 36.3 g HDDA was added to give the silica acrylate, a TQ/HDDA blend, in a mixture of methoxypropanol and water.

SAMPLE 3

A 158 g sample of the silica acrylate solution containing the equivalent of 75.0 g silica acrylate was blended with 75.0 g TMPTA, 9.0 g Vicure 55, 0.5 g BYK310, and 61 g IPA. The coating was applied as is (40% silica and acrylate solids) to $\frac{1}{8}$" Lexan LS2-111 polycarbonate by flow coating, and was processed as in Sample 2. The coating had good scribed tape-pull adhesion and resistance to 11 double rubs with #0000 steel wool. After Taber abrading for 500 cycles with 500 gram weights, the panel had a delta haze of 4.1%.

It is apparent through these experiments that the lack of a strip does not harm the coating hardness. It is also apparent that this process is considerably less hazardous and more reliable where the reaction can be totally subdued during processing and the temperature is low when HDDA is present. The benefit of capacity improvement using methoxypropanol, is also significant in that the volume is increased by a factor of three. On scale-up to 1,000 gallons, this would eliminate the 22 hour strip step in the 36 hour total process—a time savings of more than 60%. Of particular importance also, is the process using methoxypropanol, which is 7.7 times more efficient in consideration of time and volume efficiency.

EXAMPLE IV—SAMPLES 4-6

Component A, the TQ/HDDA blend from Example I having a viscosity of 68 cps, was mixed with the components discussed below.

To 6.25 grams of Component A, was added 6.0 g dipentaerythritol monohydroxypentaacrylate (SR399 from Sartomer), 2.75 g octyldecylacrylate (ODA from Radcure Specialties), 0.9 g Uvinul 400 UV absorber (BASF Corporation, Piscataway, NJ), 0.45 g Tinuvin 328 UV absorber (Ciba-Geigy Corporation, Hawthorne, NY), and 0.45 g Cyasorb 5411 UV absorber (American Cyanamid, Wayne, NJ). The mixture was catalyzed with 3 pph photoinitiator blend consisting of 0.15 g benzoin isopropylether (Polysciences), 0.15 g Irgacure 907 photoinitiator (Ciba Giegy) and 0.15 g Irgacure 184 photocuring agent (Ciba Geigy). One part of the mixture was dissolved in 2 parts IPA and 2 parts methoxypropanol, and the mixture (Sample 4) was spray coated onto Lexan ® polycarbonate. The coating was allowed to flash for 6 minutes at 25° C., and was then cured by passing it 7 times at 40 fpm through a PPG Processor (2–300 Watt per inch, Aetek medium pressure mercury lamps). The coating had a delta haze of 5.7% after Taber abrading for 300 cycles using a 500 g weight.

A second aliquot of the above coating was catalyzed instead with 6 pph photoinitiator blend consisting of 0.45 g benzoin isopropylether and 0.45 g Irgacure 651 UV curing agent (Ciba Giegy). This coating was diluted 1:1 by weight in IPA and was spray coated (Sample 5) onto Lexan ® polycarbonate. A 40 second flash time was followed by cure as above in 6 passes. It remained soft to #0000 steel wool and did not pass scribed tape-pull adhesion (3M #670 tape). A second application on Lexan ® polycarbonate (Sample 6) was allowed to flash for 5 minutes at 25° C. It was cured for 8 passes at 40 fpm and passed adhesion. The sample had a delta haze of 9.5% after 300 cycles using a 500 g weight.

All three coatings were placed in a UVCON weatherometer (Atlas) with FS40 bulbs having a cycle of 70° C. and UV light for 8 hours, followed by 4 hours condensing at 50° C. After 600 hours of total time, the first coating failed scribed adhesion, but the third coating passed 830 hours, and failed scribed adhesion at 1057 hours. Haze and YI values are recorded in Table 1.

TABLE 1

| COAT-ING | HOURS | UVCON TESTING | | | Delta % HAZE | ADHESION |
|---|---|---|---|---|---|---|
| | | PI (PPH) | YI | FLASH | | |
| Sample 4 | 830 | 3 | 8 | 6 | 12 | Fail |
| Sample 5 | 882 | 6 | 5 | 0.66 | 3.5 | Fail |
| Sample 6 | 830 | 6 | 4 | 5 | 2 | Pass |

Only Sample 6, which had a higher PI level than Sample 4 and a much longer flash than Sample 5, passed the adhesion test.

EXAMPLE V—SAMPLES 7-13

A photoinitiator and TMPTA were introduced in various amounts and combinations to Component A and a suitable solvent blend resulting in the samples below. Increasing the level of photoinitiator and incorporating TMPTA gave good abrasion resistance and eliminated cracking of the substrate when coated on styrene. Vicure 55 is abbreviated VI55 and Vicure 10, also from Akzo Chemie, is abbreviated VI10. Abrasion (ABR) tests were either OK or negative (NG) and observed cracking is abbreviated (CR). (Table 2)

TABLE 2

| | | COATINGS ON STYRENE | | | | |
|---|---|---|---|---|---|---|
| COATING | PI (PPH) | TMPTA | FLASH | FPM | PASSES | COMMENTS |
| Sample 7 | VI55(3) | 0 | 0.5 | 15 | 1 | CR, ABR-OK |
| Sample 8 | VI55(3) | 0 | 2 | 30 | 1 | FEW CR, ABR-NG |
| Sample 9 | VI55(3) | 0 | 2 | 45 | 5 | FEW CR, ABR-OK |
| Sample 10[1] | VI10(3) | 50% | 2.5 | 15 | 1 | CR |
| Sample 11 | VI10 + 55(6) | 50% | 2 | 30 | 1 | OK, ABR-OK |
| Sample 12 | VI10 + 55(6) | 50% | 2 | 30 | 3 | CR |
| Sample 13 | VI55(6) | 50% | 2.5 | 30 | 1 | OK[2] |

[1]contains 0.5% BYK300 surfactant
[2]coating crack at dirt particle only

EXAMPLE VI—SAMPLES 14-33

Variations in photoinitiator levels in formulations of a 1:1 blend of Component A and TMPTA, diluted to 30% solids in 1:1::IPA:methoxypropanol, demonstrate that there clearly is utility of greater than 5 pph photoinitiator. The particular photoinitiator used was Vicure 55, mentioned above as having a lower molecular weight than α,α-diethoxyacetophenone.

TABLE 3

VARIATIONS IN PHOTOINITIATOR LEVEL

| COATING | PPHVI55 | FPM | PASSES | DELTA % HAZE[3] | ADHESION[4] |
|---|---|---|---|---|---|
| Sample 14 | 3 | 5 | 1 | 4.4 | OK |
| Sample 15 | 3 | 10 | 1 | 4.3 | OK |
| Sample 16 | 3 | 25 | 2 | 4.5 | OK |
| Sample 17 | 4 | 10 | 1 | 4.7 | OK |
| Sample 18 | 4 | 20 | 2 | 3.6 | OK |
| Sample 19 | 4 | 25 | 2 | 4.3 | OK |
| Sample 20 | 5 | 10 | 1 | 3.3 | OK |
| Sample 21 | 5 | 25 | 1 | 8.1 | OK |
| Sample 22 | 5 | 50 | 2 | 8.4 | OK |
| Sample 23 | 6 | 25 | 1 | 5.5 | OK |
| Sample 24 | 6 | 50 | 2 | 6.8 | OK |
| Sample 25[5] | 6 | 10 | 1 | 4.1 | OK |
| Sample 26[5] | 6 | 30 | 1 | 5.1 | OK |
| Sample 27[5] | 6 | 50 | 1 | 8.6 | OK |
| Sample 28 | 7 | 10 | 1 | 5.3 | OK |
| Sample 29 | 7 | 25 | 1 | 4.2 | OK |
| Sample 30 | 7 | 50 | 1 | 8.6 | OK |
| Sample 31 | 8 | 25 | 1 | 6.3 | OK |
| Sample 32 | 8 | 50 | 1 | 8.1 | OK |
| Sample 33 | 8 | 72 | 2 | 6.0 | OK |

[3]500 cycles Taber, 500 gram per wheel, CS-10F wheels
[4]scribed tape-pull adhesion
[5]56% RH during coating vs 54% RH for the Samples 14–24 and 28–33

The hardcoats containing Vicure 55 exhibited acceptable delta haze and adhesion properties over a wide range of concentration and cure rates, even when cured by a single pass under a UV light source.

A delta haze of less than 10% is highly desirable. In comparing Samples 21, 32 and 33, it can be determined that adding 8 pph photoinitiator and curing in one pass at 50 fpm (Sample 32) provides a product having the same delta haze after abrading (8.1) as the product containing 5 pph photoinitiator which was cured in one pass at 25 fpm (Sample 21). Also, even higher cure rates, e.g. 72 fpm, can be used with two passes (Sample 33) to provide a delta % haze after abrading of only 6.0.

The strip-free process of the present invention provides a safe and quick process for producing a UV curable hardcoat. The hardcoats are as reliable as those made by currently available strip processes. The present invention also provides a process which is much more efficient than the prior art in terms of both time and volume. According to the present invention, only about 13% as much water miscible alcohol is necessary to form a base formulation when methoxypropanol is used instead of isopropyl alcohol. Also, faster curing and harder coatings are provided according to the present invention through the use of greater than 5 percent by weight photoinitiator.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A method for making a UV curable hardcoat composition, comprising the steps of:
   (1) agitating a mixture of water miscible alcohol, colloidal silica and a silyl acrylate of the formula

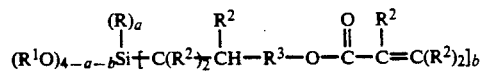

whereby the colloidal silica provides quadrifunctional (Q) silicon atoms and the silyl acrylate provides trifunctional (T) silicon-containing acrylates to form a TQ mixture and wherein the silylacrylate is present in at least one part by weight per ten parts by weight of silica.
   (2) adding acrylic monomer of the formula

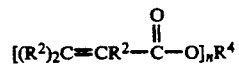

to the resulting mixture of (1) where R is a $C_{(1-13)}$ monovalent organic radical, $R^1$ is a $C_{(1-8)}$ alkyl radical, $R^2$ is selected from hydrogen, R and mixtures thereof, $R^3$ is a $C_{(1-8)}$ alkylene radical, $R^4$ is a polyvalent organic radical, a is a whole number equal to 0–2 inclusive, b is an integer equal to 1–3 inclusive, the sum of a+b is equal to 1–3, and n is an integer from 2 to 6 inclusive; and
   (3) adding a UV photoinitiator wherein said photoinitiator is methylbenzoylformate to the resulting mixture of (2), said method being substantially free of a solvent strip step.

2. A method according to claim 1, wherein the silyl acrylate is γ-methacryloxypropyl trimethoxysilane.

3. A method according to claim 1, wherein the acrylic monomer is a mixture of hexanedioldiacrylate and trimethylolpropane triacrylate.

4. A method according to claim 1, wherein the water miscible alcohol is methoxypropanol.

5. A method according to claim 4, wherein the resulting mixture of (2) comprises greater than about 40% solids.

6. A method according to claim 4, wherein said water miscible alcohol comprises less than 50% of the resulting mixture of (3).

7. A method according to claim 1, further comprising the step of
   (4) adding at least one UV absorber.

8. A method according to claim 7, wherein said UV absorber is an acrylate modified 2,4-dihydroxy benzophenone.

9. A method according to claim 1, further comprising the step of
   (4) adding at least one UV absorber to the resulting mixture of (3).

10. A method according to claim 1, wherein said acrylic monomer is hexanedioldiacrylate, and said method further comprises the step of
    (4) adding γ-methacryloxypropyl trimethoxysilane to the resulting mixture of (2).

11. A method according to claim 1 wherein said acrylic monomer is hexanedioldiacrylate, and said method further comprises the step of
    (4) adding γ-methacryloxypropyl trimethoxysilane to the resulting mixture of (3).

12. A method according to claim 1, wherein said water miscible alcohol comprises less than 50% of the resulting mixture of (3).

13. A method according to claim further comprising the steps of (4) applying the resulting mixture of (3) to a substrate, and (5) exposing the applied composition of (4) to a UV light source.

14. A method according to claim 1, further comprising the step of adding at least one flow control additive comprising a polyester modified polydimethylsiloxane.

15. The method of claim 1 wherein the UV photoinitiator is present in an amount greater than 5 parts by weight based upon the total weight of the non-volatile components of the mixture of water miscible alcohol, colloidal silica and silyl acrylate and the acrylic monomer.

* * * * *